(12) United States Patent
Herrera Leiva et al.

(10) Patent No.: US 12,220,376 B2
(45) Date of Patent: Feb. 11, 2025

(54) SENSORY BAND FOR OBSTACLE DETECTION IN THE VISUAL FIELD OF A USER WITH VISUAL IMPAIRMENT

(71) Applicants: UNIVERSIDAD DE TALCA, Talca (CL); Silvana Nicole Herrera Leiva, Talca (CL)

(72) Inventors: Silvana Nicole Herrera Leiva, Talca (CL); Jorge Andrés Cartes Sanhueza, Talca (CL)

(73) Assignees: Silvana Nicole Herrera Leiva, Talca (CL); UNIVERSIDAD DE TALCA, Talca (CL)

(*) Notice: Subject to any disclaimer, the term of this patent is extended or adjusted under 35 U.S.C. 154(b) by 0 days.

(21) Appl. No.: 18/016,323

(22) PCT Filed: Jul. 14, 2021

(86) PCT No.: PCT/CL2021/050063
§ 371 (c)(1),
(2) Date: Jan. 13, 2023

(87) PCT Pub. No.: WO2022/011488
PCT Pub. Date: Jan. 20, 2022

(65) Prior Publication Data
US 2023/0285220 A1    Sep. 14, 2023

(30) Foreign Application Priority Data
Jul. 14, 2020 (CL) .................................. 1870-2020

(51) Int. Cl.
*G02C 5/00* (2006.01)
*A61H 3/06* (2006.01)
*G01S 15/42* (2006.01)

(52) U.S. Cl.
CPC .............. *A61H 3/061* (2013.01); *G01S 15/42* (2013.01); *A61H 2003/063* (2013.01); *A61H 2201/165* (2013.01)

(58) Field of Classification Search
CPC .. G06F 1/163; G06F 2203/0331; G06F 3/005; G06F 3/011; G06F 3/013;
(Continued)

(56) References Cited

U.S. PATENT DOCUMENTS 6,671,226 B1    12/2003    Finkel et al.
8,902,315 B2    12/2014    Fisher et al.
(Continued)

FOREIGN PATENT DOCUMENTS

CN    2500297 Y        7/2002
EP    0777455 B1       9/2001
KR    1020190033723 A  4/2019

OTHER PUBLICATIONS

Extended European Search Report dated Apr. 15, 2024, in European Application EP 21843290.4.
(Continued)

*Primary Examiner* — Dionne Pendleton
(74) *Attorney, Agent, or Firm* — Procopio, Cory, Hargreaves & Savitch LLP

(57) ABSTRACT

The present invention relates to the technical field of physiotherapeutic apparatuses and devices for locating or stimulating reflex points in the body of a patient. Specifically, it provides a sensory band comprising a frame having two arched arms, two antennas, a pair of ultrasonic transducers, three vibrators, and a microcontroller operatively connected to said pair of ultrasonic transducers, and to said three vibrators. The present invention further provides a method for obstacle detection that comprises said sensory band, wherein said method comprises the steps of transmitting an
(Continued)

ultrasonic wave by means of said pair of ultrasonic transducers; measuring the reflection of said ultrasonic wave by means of said pair of ultrasonic transducers; providing vibrations to said three vibrators, from the reflection characteristics of said ultrasonic wave; wherein said vibration varies depending on the reflection characteristics of said ultrasonic wave.

11 Claims, 3 Drawing Sheets

(58) Field of Classification Search
CPC ........ G06F 3/017; G06F 3/04842; G06F 3/14; G06F 3/012; G06F 3/016; G06F 3/167; G06F 1/1671; G06F 1/1673; G06F 1/1694; G06F 2203/011; G06F 2218/12; G06F 3/01; G06F 3/014; G06F 3/015; G06F 3/0304; G06F 3/03545; G06F 3/03547; G06F 3/038; G06F 3/0426; G06F 3/0482; G06F 3/04847; G06F 3/0488; G06F 3/16; G02C 5/143; G02C 11/10; G02C 5/001; G02C 5/14; G02C 11/06; G02B 27/017; G02B 27/0093; G02B 2027/0178; G02B 2027/0138; G02B 2027/014; G02B 2027/0123; G02B 2027/0127; G02B 2027/0169; G02B 27/01; G02B 27/0172; G02B 27/0176; G06V 20/20; G06V 10/768; G06V 40/10; G06V 40/70; G01S 15/42; G01S 15/876; G01S 15/88; G01S 15/93; G01S 3/8034; B06B 1/0215; B06B 2201/70; A61H 2003/063; A61H 2201/1207; A61H 2201/1604; A61H 2201/165; A61H 3/061; H04R 2460/13; H04R 5/0335; H04R 1/1008; H04R 1/083; H04R 1/1016; H04R 1/1041; H04R 1/1066; H04R 1/1075; H04R 1/1083; H04R 1/1091; H04R 1/406; H04R 1/46; H04R 2430/23; H04R 2460/07; H04R 2499/15; H04R 3/005; H04R 5/02; H04R 5/033; H04M 1/6066; H04M 1/05; H04M 1/72412; H04M 2250/02; H04N 23/66; H04N 23/54; H04N 23/55; H04N 23/57; H04N 9/3194; H04W 4/80; H04W 4/14; H04W 68/00; G01C 21/1656; G01C 21/20; G01C 21/206; G01C 21/3602; G06Q 30/02; G06K 19/07762; H04S 2400/11; H04S 2420/01; H04S 7/304; H04L 67/10; H04L 67/55; G10L 15/22; G10L 15/26; G09G 2360/144; G09G 3/001; G09G 3/342; G09G 3/346; G06T 19/006; G06T 7/70

See application file for complete search history.

(56) References Cited

U.S. PATENT DOCUMENTS

| | | | |
|---|---|---|---|
| 9,773,391 | B1 | 9/2017 | Foshee et al. |
| 11,026,024 | B2* | 6/2021 | Sahota .................... H04R 5/033 |
| 2008/0312719 | A1 | 12/2008 | Keilman |
| 2012/0053826 | A1 | 3/2012 | Slamka |
| 2014/0268008 | A1* | 9/2014 | Howell .................. G02C 11/10 351/158 |
| 2015/0161872 | A1 | 6/2015 | Beaulieu et al. |
| 2015/0268475 | A1 | 9/2015 | Lee et al. |
| 2015/0356837 | A1 | 12/2015 | Pajestka et al. |
| 2016/0123745 | A1 | 5/2016 | Cotier et al. |
| 2016/0374628 | A1 | 12/2016 | Levine |
| 2019/0070064 | A1 | 3/2019 | Hogle et al. |
| 2019/0182415 | A1* | 6/2019 | Sivan ...................... G06F 3/013 |
| 2021/0121331 | A1* | 4/2021 | Nikolovski ............. G01S 7/521 |

OTHER PUBLICATIONS

Office Action dated Mar. 17, 2021, in Chilean Application No. 202001870.

Office Action dated Aug. 11, 2021, in Chilean Application No. 202001870.

* cited by examiner

SENSORY BAND FOR OBSTACLE DETECTION IN THE VISUAL FIELD OF A USER WITH VISUAL IMPAIRMENT

TECHNICAL FIELD OF THE INVENTION

The present invention relates to the technical field of physiotherapeutic apparatuses and devices for locating or stimulating reflex points in the body, in particular with apparatuses for aiding patients or people with a disability of walking. Specifically, it provides a sensory band for obstacle detection in the visual field of a user and a method for obstacle detection in the visual field of a user.

BACKGROUND OF THE INVENTION

In the world there are approximately 285 million visually impaired people, of which 39 million are blind and 246 million have a degree of visual impairment. In order to help with the mobility of these people, multiple solutions have been used, mainly corresponding to automated devices, such as walking sticks, glasses, headphones, among others.

Among the solutions described in the state of the art are, for example, what is proposed in document CN2500297, which describes an ultrasonic echo navigating device for blind people that includes glasses, a detection case, and left and right headphones, characterized in that said glasses are provided with an ultrasonic transmitter sensor and an ultrasonic receiver sensor, wherein said ultrasonic transmitter and said ultrasonic receiver are connected in a detection circuit in said detection case. Said detection circuit comprises a signal reception and transmission circuit for receiving and transmitted external ultrasonic signals and transmitted signals to said left and right headphones after calculation and amplification. And a signal frequency control circuit configured to transmit the contrast signals and adjust the frequency.

On the other hand, document U.S. Pat. No. 7,015,812 provides an apparatus comprising an ear protector for providing acoustic isolation for a user in a noisy environment, a self-contained ranging means disposed entirely within said ear protector for detecting a moving object in the proximity, no part of said ranging means being disposed on or in said moving object. Said moving object and user being present in said noisy environment, wherein said user is incapable of audibly detecting said object or its movement toward said user without using the ear a protector having an audio transducer. The apparatus further comprises means for generating an audible alarm signal when said moving object approaches said user, said audible alarm signal being communicated within said ear protector to allow said user to respond to said audible alarm signal without compromise of sound protection by said ear protector.

However, the solutions described in the state of the art present invasive devices for the user. On the one hand, they limit other sensory and physiological functions, and on the other hand they are complex devices that require difficult installation.

Consequently, there is a need for a device for obstacle detection in the visual field of a user that is autonomous, intuitive, and easily wearable, but above all non-invasive; more like an accessory. In other words, that allows the user to detect obstacles in their surroundings, facilitating mobility and movement without sensory and physiological limitations.

SUMMARY OF THE INVENTION

The present invention provides a sensory band for obstacle detection in the visual field of a user, characterized in that it comprises:
  a frame having a curved portion (11) and two arched arms (12a, 12b) connected to said curved portion (11);
  two antennas (13a, 13b), each of said antennas (13a, 13b) positioned in a corresponding arm of said two arched arms (12a, 12b) in its upper front portion;
  two ultrasonic transducers (14a, 14b), each of said ultrasonic transducers (14a, 14b) positioned at the end of a corresponding antenna of said two antennas (13a, 13b), each of said ultrasonic transducers (14a, 14b) comprising an ultrasound transmitter and an ultrasound receiver;
  a first vibrator (15a) and a second vibrator (15b), each of them positioned in a corresponding arm of said two arched arms (12a, 12b), and a third vibrator (15c) positioned in a back central area of said curved portion (11) of the frame; and
  a microcontroller (16) operatively connected to said ultrasonic transducers (14a, 14b) and to said first, second, and third vibrators (15a, 15b, 15c);
  wherein said microcontroller (16) is configured to:
  a) transmit an ultrasound signal by means of the transmitters of said ultrasonic transducers (14a, 14b);
  b) detect a signal reflected in an obstacle by means of the receivers of said ultrasonic transducers (14a, 14b);
  c) obtain a characteristic of said reflected signal; and
  d) vibrate said vibrators (15a, 15b, 15c), wherein the vibration of each of said vibrators (15a, 15b, 15c) depends on said characteristic of said reflected signal.

In a preferred embodiment, the sensory band is characterized in that said microcontroller is configured to vary the corresponding vibratory intensities of said first vibrator, said second vibrator, and said third vibrator.

In another preferred embodiment, the sensory band is characterized in that each arched arm of said two arched arms surrounds a respective ear of the user, when arranged on their head.

In another preferred embodiment, the sensory band is characterized in that each ultrasonic transducers of said two ultrasonic transducers (14a, 14b) is positioned close (in front of or at the same level) to the eyeball. This position guarantees or simulates a detection area equivalent to that of the binocular and monocular visual field of the user.

In a further preferred embodiment, the sensory band is characterized in that said curved portion and said two arched arms of said frame are configured in a detachable manner.

In a further preferred embodiment, the sensory band is characterized in that said frame is made of medical grade silicone.

The present invention also provides a method for obstacle detection in the visual field of a user using the band of the present invention, characterized in that it comprises the steps of:
  a) providing a sensory band comprising a frame having a curved portion and two arched arms connected to said curved portion; two antennas, each of said antennas connected in its upper front portion to a corresponding arched arm of said two arched arms; two ultrasonic transducers each of said ultrasonic transducers positioned at the end of a corresponding antenna of said two antennas, each of said ultrasonic transducers comprising an ultrasound transmitter and an ultrasound receiver; a first vibrator and a second vibrator, each of them positioned in a corresponding arched arm of said two arched arms, and a third vibrator positioned in a back central area of said curved portion of the frame; and a microcontroller operatively connected to said ultrasonic transducers and to said first, second, and third vibrator;

b) transmitting, through said sensory band, an ultrasound signal by means of the transmitters of said ultrasonic transducers;

c) detecting, through the sensory band, a signal reflected in an obstacle by means of the receivers of said ultrasonic transducers;

d) obtaining a characteristic from said reflected signal by means of said microcontroller; and e) providing vibrations to said first, second, and third vibrator from said characteristic of said reflected signal, wherein said vibration varies its intensity depending on said characteristic of said reflected signal.

In a preferred embodiment, the method is characterized in that said characteristic of said reflected signal is selected from the group consisting of amplitude, frequency, phase shift, time of flight, as well as a combination thereof.

In another preferred embodiment, the method is characterized in that it further comprises the step of obtaining a distance and a direction of said obstacle by means of said microcontroller, and in that said vibration of said first vibrator, of said second vibrator, and said third vibrator depends on said distance and said direction.

In another preferred embodiment, the method is characterized in that said transmitted ultrasound signal has a frequency between 20 kHz and 50 kHz.

In a further preferred embodiment, the method is characterized in that said transmitted ultrasound signal is transmitted continuously or as a pulse, as well as a combination thereof.

DETAILED DESCRIPTION OF THE INVENTION

Figure 1:
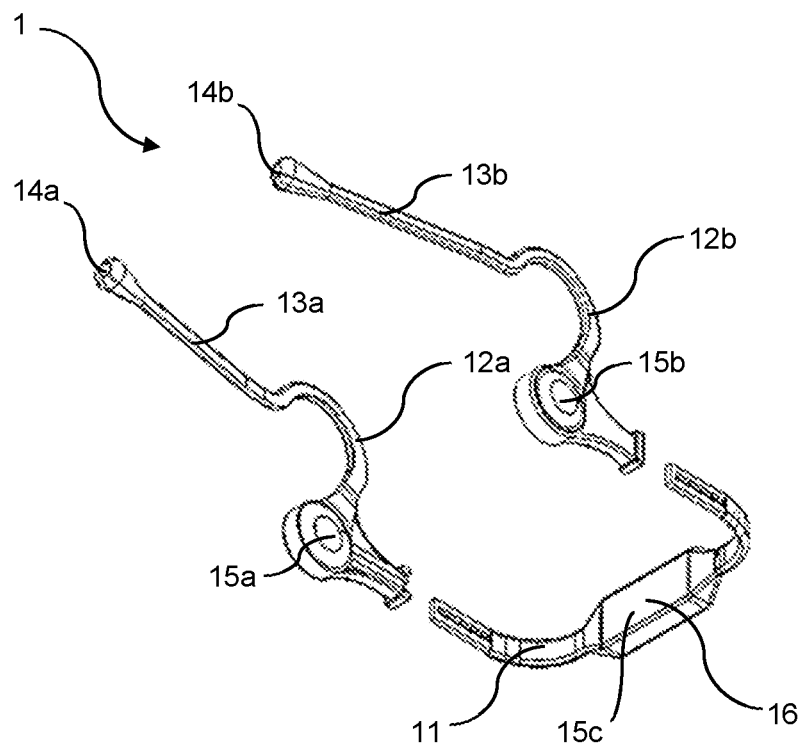
FIG. 1 shows an isometric view with an exploded view of a preferred embodiment of the sensory band for obstacle detection in the visual field of a user that is the object of the present invention.
Figure 2:
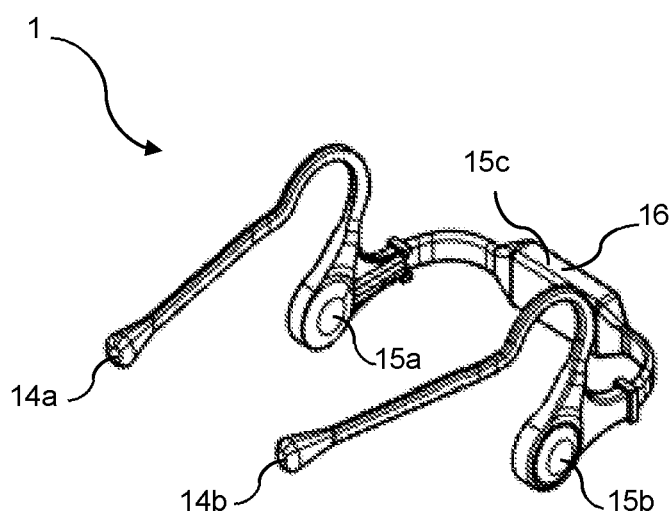
FIG. 2 shows an isometric view of a preferred embodiment of the sensory band for obstacle detection in the visual field of a user that is the object of the present invention.
Figure 3:
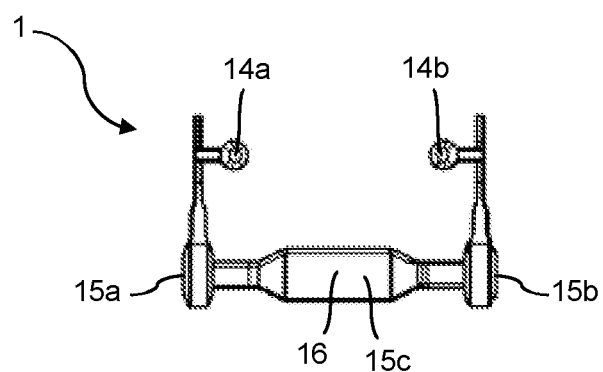
FIG. 3 shows a front view of a preferred embodiment of the sensory band for obstacle detection in the visual field of a user that is the object of the present invention.
Figure 4:
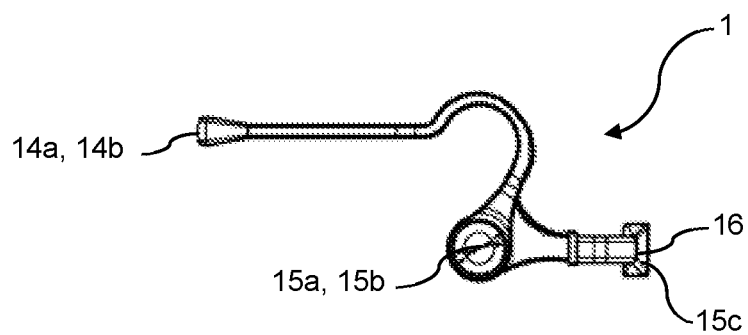
FIG. 4 shows a side view of a preferred embodiment of the sensory band for obstacle detection in the visual field of a user that is the object of the present invention.

As described before, the present invention provides a sensory band (1) for obstacle detection in the visual field of a user, comprising:
 a frame having a curved portion (11) and two arched arms (12a, 12b) connected to said curved portion (11);
 two antennas (13a, 13b), each of said antennas (13a, 13b) connected in its upper front portion to a corresponding arched arm of said two arched arms (12a, 12b);
 two ultrasonic transducers (14a, 14b), each of said ultrasonic transducers (14a, 14b) positioned at the end of a corresponding antenna of said two antennas (13a, 13b), each of said ultrasonic transducers (14a, 14b) comprising an ultrasound transmitter and an ultrasound receiver;
 a first vibrator (15a) and a second vibrator (15b), each of them positioned in a corresponding arm of said two arched arms (12a, 12b), and a third vibrator (15c) positioned in a back central area of said curved portion (11) of the frame; and
 a microcontroller (16) operatively connected to said ultrasonic transducers (14a, 14b) and to said first vibrator, second vibrator, and third vibrator (15a, 15b, 15c), wherein said microcontroller (16) is configured to:
 a) transmit an ultrasound signal by means of the transmitters of said ultrasonic transducers (14a, 14b);
 b) detect a signal reflected in an obstacle by means of the receivers of said ultrasonic transducers (14a, 14b);
 c) obtain a characteristic of said reflected signal; and
 d) vibrate said vibrators (15a, 15b, 15c), wherein the vibration of each of said vibrators (15a, 15b, 15c) depends on said characteristic of said reflected signal.

In the context of the present invention, and without limiting the scope of protection, the relative positions, such as up, down, left, right, front, back, anterior, posterior, among others, will be understood as referring to a user or person who wears the sensory band (1) when the same is normally in use.

In the context of the present invention, without limiting the scope of protection, a curved portion will be understood as the portion that has curved ends, that is, regardless of the shape of its central portion, its ends are smoothed in such a way that a vertex is not formed.

Additionally, in the context of the present invention, without limiting the scope of protection, an arm will be understood as an extension that detaches from or connects to another structure. The shape and dimensions of said frame do not limit the scope of the present invention, therefore, the shape and dimensions of said curved portion (11) and said two arched arms (12a, 12b) do not limit the scope of the present invention either. In a preferred embodiment, and without limiting the scope of protection, said curved portion (11) has a straight shape with curved ends and dimensions between 100 mm and 200 mm long, between 10 mm and 30 mm thick. In an even more preferred embodiment, said curved portion (11) has a length of 150 mm and a thickness of 10 mm. On the other hand, said two arched arms (12a, 12b) may have a rounded section, designed to border the ear of the user, without limiting the scope of the present invention. In a preferred embodiment, and without limiting the scope of protection, said two arched arms (12a, 12b) may have a radius between 50 mm and 100 mm, a thickness between 10 mm and 30 mm. In an even more preferred embodiment, said two arched arms (12a, 12b) have a radius of 50 mm and a thickness of 8 mm.

In addition, the material from which said frame is made does not represent a limiting characteristic. In a particularly advantageous embodiment, and without limiting the scope of protection, the frame of the sensory band (1) is made of silicone. In an even more preferred embodiment, the frame of the sensory band (1) is made of medical grade silicone. The weight of said frame does not limit the scope of the present invention and will depend, without being limited thereto, on the shape, dimensions, and material with which said frame is fabricated. In a preferred embodiment, and without limiting the scope of protection, said frame weighs between 50 and 200 grams. In an even more preferred embodiment, said frame weighs 100 grams.

The sensory band (1) that is the object of the present invention has, additionally, two antennas (13a, 13b) that are connected respectively to each of the arched arms (12a, 12b). In the context of the present invention, and without limiting the scope of protection, an antenna will be understood as an elongated structural element that projects from said frame, from each of the two arched arms (12a,12b). The shape, length, and direction of projection of each of said two antennas (13a, 13b) do not limit the scope of the present invention. In a preferred embodiment, and without limiting the scope of protection, each of said two antennas (13a, 13b) has a straight shape with a circular cross section, with a length between 60 mm and 120 mm, and a diameter between 5 mm and 15 mm. In an even more preferred embodiment, each of said two antennas (13a, 13b) has a straight shape with a circular cross section, and with a length of 100 mm and a diameter of 8 mm. On the other hand, said two antennas (13a, 13b) may be connected to each of said two arched arms (12a, 12b) in a fixed manner or a mobile manner without limiting the scope of the present invention. In the context of the present invention, without limiting the scope of protection, a fixed connection will be understood as the one in which the direction and orientation of said two antennas (13a, 13b) is fixed, while a mobile connection will be understood as the one in which the direction and orientation of said two antennas can be modified. In the case of mobile connection, the means by which said mobile connection is provided do not limit the scope of the present invention. In a particularly advantageous embodiment, said two antennas are connected to said two arched arms in a fixed manner. In another preferred embodiment, and without limiting the scope of the present invention, said antennas (13a, 13b) are positioned in the upper front part of said frame.

Additionally, the sensory band (1) comprises two ultrasonic transducers (14a, 14b), wherein each of said two ultrasonic transducers is positioned at the end of a corresponding antenna (13a, 13b), as seen in the figures. Each of said two ultrasonic transducers (14a, 14b) has an ultrasound transmitter and an ultrasound receiver. The shape, size, frequency range, and amplitude range of said two ultrasound transducers (14a, 14b) do not limit the scope of the present invention. In a preferred embodiment, and without limiting the scope of protection, said two ultrasound transducers (14a, 14b) have a cylindrical shape with a length of 16 mm and a diameter of 16 mm, and with a reading speed of 20 Hz. Additionally, said transmitter and receiver may operate in the same frequency band or in different frequency bands without limiting the scope of the present invention. On the other hand, the brand, type, and model of said two ultrasonic transducers (14a, 14b) do not limit the scope of the present invention. In a preferred embodiment, and without limiting the scope of protection, said two ultrasonic transducers (14a, 14b) are LV-MaxSonar-EZ1 high performance ultrasonic sensors.

Figure 5:
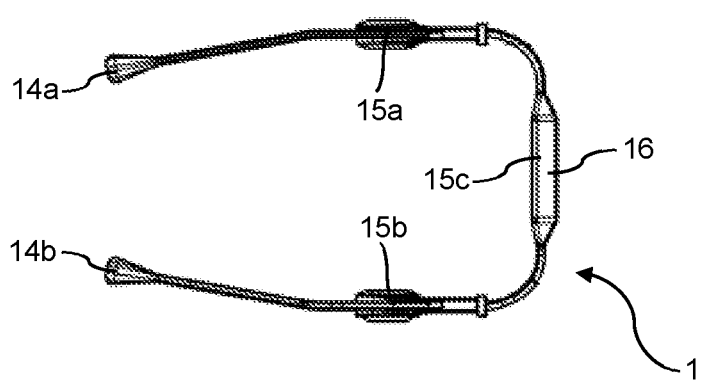
FIG. 5 shows a top view of a preferred embodiment of the sensory band for obstacle detection in the visual field of a user that is the object of the present invention.

On the other hand, the sensory band (1) for obstacle detection in the visual field of a user comprises a first vibrator (15a), a second vibrator (15b), and a third vibrator (15c), wherein said first vibrator (15a) and said second vibrator (15b) are positioned at a corresponding arched arm of said two arched arms (12a, 12b), as shown in the figures, and said third vibrator (15c) is positioned in a central portion of said curved portion (11), as shown in FIG. 5. In a preferred embodiment, and without limiting the scope of protection, said first vibrator (15a) and said second vibrator (15b) are positioned in a portion of said pair of arched arms (12a, 12b) which, when in use, touch a lateral area of the head of the user, on their left and right side respectively. In another preferred embodiment, and without limiting the scope of protection, said third vibrator (15c) touches the central back area of the head of the user. The shape, dimensions, vibration frequency, and vibration amplitude of said first vibrator (15a), said second vibrator (15b), and said third vibrator (15c) do not limit the scope of the present invention. In a preferred embodiment, and without limiting the scope of protection, the sensory band (1) may comprise additional vibrators to said first vibrator (15a), said second vibrator (15b), and said third vibrator (15c). In said preferred embodiments, the position, shape, dimensions, vibration frequency, and vibration amplitude of said additional vibrators do not limit the scope of the present invention. Additionally, in said preferred embodiments, the microcontroller (16) is operatively connected to each of said additional vibrators. In an exemplary embodiment, without limiting the scope of protection, said first vibrator (15a) may be positioned touching the right atrio-cranial zone of the user, said second vibrator (15b) may be positioned touching the left atrio-cranial zone of said user, and said third vibrator (15c) may be centrally positioned touching the C1 atlas vertebra area of said user. Additionally, the type, model, and brand of said vibrators (15a, 15b, 15c) do not limit the scope of the present invention. In a preferred embodiment, and without limiting the scope of protection, said vibrators are a PWM vibration motor module for Arduino nano.

The union or form of assembly of the pieces forming the frame of the sensory band (1) for obstacle detection in the visual field of a user does not limit the scope of the present invention. These may be manufactured in a single piece, both the curved portion (11) and the two arched arms (12a, 12b), manufacture each of the pieces separately and join them through assembly elements, among others. In a preferred embodiment, and without limiting the scope of protection, said frame comprises three pieces, namely, a curved portion (11) and two arched arms (12a, 12b), that are configured in a detachable manner, as seen schematically in the exploded view of FIG. 1. In this last preferred embodiment, the means by which said detachable configuration is provided do not limit the scope of the present invention. For example, and without limiting the scope of the present invention, said detachable configuration may be provided by a male-female configuration, by a threaded connection, by magnetized connections, as well as combinations thereof.

Figure 6:
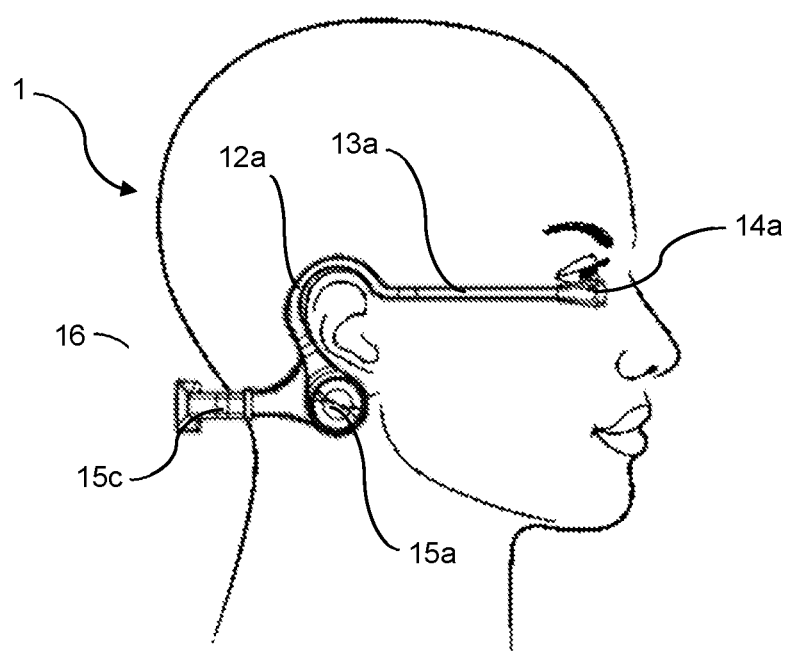
FIG. 6 shows an isometric view of a preferred embodiment of the sensory band for obstacle detection in the visual field, placed on the head of a user.

On the other hand, in a preferred embodiment, and without limiting the scope of protection, each ultrasonic transducer of the two ultrasonic transducers (14a, 14b), positioned at the corresponding two antennas (13a, 13b), are located at least at the level of the eyeball of the user. In another preferred embodiment, and without limiting the scope of protection, each ultrasonic transducer of the two ultrasonic transducers (14a, 14b), positioned at the corresponding two antennas (13a, 13b), are located in front of the eyeball of the user, as shown in FIG. 6. This ensures that the detection area be equivalent to that of the binocular and monocular visual field of the user.

Additionally, as previously mentioned, the sensory band (1) that is the object of the present invention comprises a microcontroller (16) that is in charge of the operation of said sensory band (1) for obstacle detection in the visual field of a user. Said microcontroller (16) is operatively connected to the two ultrasonic transducers (14a, 14b), and to said first (15a), second (15b), and third vibrators (15c). In the context of the present invention, it will be understood that said microcontroller (16) is operatively connected to said two ultrasonic transducers (14a, 14b) when said microcontroller (16) can control the transmission of an ultrasound wave by means of the transmitter of each of said two ultrasonic transducers (14a, 14b) and can detect the reception of an ultrasound wave by means of the receiver of each of said ultrasonic transducers (14a, 14b). On the other hand, said operational connection may be provided wired or wireless, without limiting the scope of the present invention.

On the other hand, in the context of the present invention, it will be understood that said microcontroller (16) is operatively connected to said vibrators (15a, 15b, 15c) when said microcontroller (16) can control the vibration of said vibrators (15a, 15b, 15c). Said operational connection may be provided wired or wireless, without limiting the scope of the present invention.

In configurational terms, said microcontroller (16) is configured to transmit an ultrasound signal by means of the transmitters of said two ultrasonic transducers (14a, 14b). The shape, amplitude, and frequency of said ultrasound signal do not limit the scope of the present invention. Additionally, said microcontroller may or may not transmit the same signal in each of said transmitters, without limiting the scope of the present invention. In a preferred embodiment, without limiting the scope of the present invention, said transmitted ultrasound signal has a frequency between 20 kHz and 50 kHz. On the other hand, said ultrasound signal may be transmitted continuously or as a pulse, as well as a combination thereof, without limiting the scope of the present invention.

Additionally, said microcontroller (16) is configured to detect a signal reflected in an obstacle by means of the receivers of said two ultrasonic transducers (14a, 14b). In this sense, said microcontroller (16), for example and without limiting the scope of the present invention, may determine a characteristic of said reflected signal. For example, and without limiting the scope of the present invention, said microcontroller (16) may determine a frequency, an amplitude, a phase shift, or a time of flight, as well as combinations thereof, of said reflected signal. In a more preferred embodiment, without limiting the scope of the present invention, said microcontroller (16) is configured to obtain a direction and a distance to said obstacle from said characteristic of said reflected signal.

In another preferred embodiment, and without limiting the scope of protection, each ultrasonic transducer of the two ultrasonic transducers (14a, 14b), positioned at the corresponding two antennas (13a, 13b), are located close (in front or at the same level) to the eyeball of the user, as shown in FIG. 6. This ensures that the detection area be equivalent to that of the binocular and monocular visual field of the user.

In the context of the present invention, and without limiting the scope of protection, a characteristic will be understood as the quality that allows determining the relation of the spatial orientation of the objects with respect to the user; mainly right-left-center and front. The detection of said characteristic is carried out by zones: right, left, front (center), right-front, left-front. Depending on the area in which said ultrasonic transducers (14a, 14b) detect the object or objects, said first vibrator (15a), second vibrator (15b), and/or third vibrator (15c) will be activated. On the other hand, the closer the detected object is to the user, the more intense the vibrations will be, and, on the contrary, the further the object is from the user, the softer the vibrations will be.

The microcontroller (16) is also configured to vibrate said vibrators (15a, 15b, 15c). Said microcontroller (16) may be configured to control the frequency, duration, and intensity of vibration of each of said vibrators (15a, 15b, 15c). Furthermore, the vibration of each of said vibrators (15a, 15b, 15c) depends on said characteristic of said reflected signal. In general terms, the microcontroller (16) activates each of said two ultrasonic transducers (14a, 14b) which transmit ultrasonic waves, said ultrasonic waves influence objects that are in the proximity, and said two ultrasonic transducers (14a, 14b) receive the reflected ultrasonic wave, said wave is communicated to the controller (16) and according to the characteristics of said reflected wave the controller activates said first vibrator (15a), said second vibrator (15b), and/or said third vibrator (15c). In a preferred embodiment, without limiting the scope of the present invention, said two ultrasonic transducers (14a, 14b) may define detection fields by areas, which, in turn, allows the microcontroller (16) to activate a vibrator (for example, the first vibrator (15a)) or two vibrators (for example, the first vibrator (15a) and the third vibrator (15c) simultaneously), depending on the place where the detected object is located. The foregoing, in turn, and without limiting the scope of the present invention, makes it possible to obtain a more accurate approximation of the objects that are in the proximity of the user. In a more preferred embodiment, said determined areas for the action of said vibrators are: front center-front left-front right-right-left. Optionally, when said microcontroller (16) is configured to obtain a distance to the obstacle, said microcontroller (16) may vary the vibratory intensity of said first vibrator (15a), said second vibrator (15b), and said third vibrator (15c) depending on both the direction and the distance with respect to the obstacle detected by means of said reflected signal, which influence said ultrasonic transducers (14a, 14b). The type, size, model, and brand of the microcontroller (16) do not limit the scope of the present invention. In a preferred embodiment, and without limiting the scope of protection, the microcontroller is an Arduino nano microcontroller.

The present invention further provides a method for obstacle detection in the visual field of a user, characterized in that it comprises the steps of:
  a) providing a sensory band comprising a frame having a curved portion (11) and two arched arms (12a, 12b) connected to said curved portion (11); two antennas (13a, 13b), each of said antennas (13a, 13b) connected in its upper front portion to a corresponding arched arm of said two arched arms (12a, 12b); two ultrasonic transducers (14a, 14b) each of said ultrasonic transducers (14a, 14b) positioned at the end of a corresponding antenna of said two antennas (13a, 13b), each of said ultrasonic transducers (14a, 14b) comprising an ultrasound transmitter and an ultrasound receiver; a first vibrator (15a) and a second vibrator (15b), each of them positioned in a corresponding arched arm of said two arched arms (12a, 12b), and a third vibrator (15c) positioned in a back central area of said curved portion (11) of the frame; and a microcontroller (16) operatively connected to said ultrasonic transducers (14a, 14b) and to said first, second, and third vibrators (15a, 15b, 15c),
  b) transmitting, through said sensory band, an ultrasound signal by means of the transmitters of said ultrasonic transducers (14a, 14b);

c) detecting a signal reflected in an obstacle by means of the receivers of said ultrasonic transducers (14a, 14b) of the band;

d) obtaining a characteristic from said reflected signal by means of said microcontroller (16); and e) providing vibrations to said first, second, and third vibrators (15a, 15b, 15c) from said characteristic of said reflected signal, wherein said vibration varies its intensity depending on said characteristic of said reflected signal.

In the method for obstacle detection in the visual field of a user, the characteristic of the reflected ultrasound signals acquired by said ultrasonic transducers (14a, 14b) does not represent a limiting characteristic to the present invention. However, in a preferred embodiment, and without limiting the scope of protection, said characteristic of said reflected signal may be the frequency of said ultrasonic signal. As previously mentioned, from the communication with said pair of ultrasonic sensors (14a, 14b), said microcontroller (16) may process said information and activate said first vibrator (15a), said second vibrator (15b), and/or said third vibrator (15c).

The number of vibrators and the selection of which vibrators activate said microcontroller (16) simultaneously may depend on the area where the obstacle is detected. Therefore, the number of vibrators and the selection of the activated vibrators do not limit the scope of the present invention. In a preferred embodiment, the microcontroller (16) activates a single vibrator, which may be the first, second, or third vibrator (15a, 15b, 15c). In another preferred embodiment, the microcontroller (16) activates two vibrators, one being the centrally positioned third vibrator (15c) and the other one selected between the first vibrator (15a) or the second vibrator (15b).

In a preferred embodiment, and without limiting the scope of protection, the method further comprises the step of positioning the sensory band on the head of a user, wherein each arched arm of said two arched arms (12a, 12b) surrounds a respective ear of a user. Additionally, that each ultrasonic transducer of said two ultrasonic transducers (14a, 14b) of said sensory band, is positioned close (in front of or at the same level) to the eyeball.

The invention claimed is:

1. A sensory band (1) for obstacle detection in a visual field of a user, characterized in that it comprises:
    a frame having a curved portion (11) and two arched arms (12a, 12b) connected to said curved portion (11);
    two antennas (13a, 13b), each of said antennas (13a, 13b) connected in its upper front portion to a corresponding arched arm of said two arched arms (12a, 12b);
    two ultrasonic transducers (14a, 14b), each of said ultrasonic transducers (14a, 14b) positioned at an end of a corresponding antenna of said two antennas (13a, 13b), each of said ultrasonic transducers (14a, 14b) comprising an ultrasound transmitter and an ultrasound receiver, and each of said ultrasonic transducers (14a, 14b) is located in front of an eyeball of the user;
    a first vibrator (15a) and a second vibrator (15b), each of them positioned in a corresponding arched arm of said two arched arms (12a, 12b), and a third vibrator (15c) positioned in a back central area of said curved portion (11) of the frame; and
    a microcontroller (16) operatively connected to said ultrasonic transducers (14a, 14b) and to said first vibrator, second vibrator, and third vibrator (15a, 15b, 15c);
    wherein said microcontroller (16) is configured to:

a) transmit an ultrasound signal by means of the transmitters of said ultrasonic transducers (14a, 14b);
    b) detect a signal reflected in an obstacle by means of the receivers of said ultrasonic transducers (14a, 14b);
    c) obtain a characteristic of said reflected signal; and
    d) vibrate said vibrators (15a, 15b, 15c), wherein the vibration of each of said vibrators (15a, 15b, 15c) depends on said characteristic of said reflected signal.

2. The sensory band (1) according to claim 1, characterized in that said microcontroller (16) is configured to vary corresponding vibratory intensities of said first vibrator (15a), said second vibrator (15b), and said third vibrator (15c).

3. The sensory band (1) according to claim 1, characterized in that each arched arm of said two arched arms (12a, 12b) surrounds a respective ear of a user.

4. The sensory band (1) according to claim 1, characterized in that said curved portion (11) and said two arms (12a, 12b) of said frame are configured in a detachable manner.

5. The sensory band (1) according to claim 1, characterized in that said frame is made of medical grade silicone.

6. A method for obstacle detection in a visual field of a user, characterized in that it comprises:
    a) providing a sensory band comprising a frame having a curved portion (11) and two arched arms (12a, 12b) connected to said curved portion (11); two antennas (13a, 13b), each of said antennas (13a, 13b) connected in its upper front portion to a corresponding arched arm of said two arched arms (12a, 12b); two ultrasonic transducers (14a, 14b) each of said ultrasonic transducers (14a, 14b) positioned at an end of a corresponding antenna of said two antennas (13a, 13b), each of said ultrasonic transducers (14a, 14b) comprising an ultrasound transmitter and an ultrasound receiver, and each of said ultrasonic transducers (14a, 14b) is located in front of an eyeball of the user; a first vibrator (15a) and a second vibrator (15b), each of them positioned in a corresponding arched arm of said two arched arms (12a, 12b), and a third vibrator (15c) positioned in a back central area of said curved portion (11) of the frame; and a microcontroller (16) operatively connected to said ultrasonic transducers (14a, 14b) and to said first, second, and third vibrators (15a, 15b, 15c);
    b) transmitting an ultrasound signal by means of the transmitters of said ultrasonic transducers (14a, 14b);
    c) detecting a signal reflected in an obstacle by means of the receivers of said ultrasonic transducers (14a, 14b) of the band;
    d) obtaining a characteristic from said reflected signal by means of said microcontroller (16); and
    e) providing vibrations to said first, second, and third vibrators (15a, 15b, 15c) from said characteristic of said reflected signal, wherein said vibration varies its intensity depending on said characteristic of said reflected signal.

7. The method according to claim 6, characterized in that said characteristic of said reflected signal is selected from the group consisting of amplitude, frequency, phase shift, time of flight, as well as a combination thereof.

8. The method according to claim 6, characterized in that it further comprises the step of obtaining a distance and a direction of said obstacle by means of said microcontroller (16), and in that said vibration of said first vibrator (15a), said second vibrator (15b), and said third vibrator (15c) depends on said distance and direction.

9. The method according to claim 6, characterized in that said transmitted ultrasound signal has a frequency between 20 kHz and 50 kHz.

10. The method according to claim 9, characterized in that said transmitted ultrasound signal is transmitted continuously or as a pulse, as well a combination thereof.

11. The method according to claim 6, characterized in that each ultrasonic transducer of said two ultrasonic transducers (14*a*, 14*b*) of said sensory band, is positioned at least at a level of the eyeball of the user.

* * * * *